US012811911B2

(12) United States Patent
Lloyd et al.

(10) Patent No.: US 12,811,911 B2
(45) Date of Patent: Nov. 24, 2026

(54) AUTOMATIC FIREWALL CONFIGURATION FOR CONTROL SYSTEMS IN CRITICAL INFRASTRUCTURE

(71) Applicant: Schneider Electric USA, Inc., Andover, MA (US)

(72) Inventors: Chad Andrew Lloyd, Old Hickory, TN (US); Daniel Andre Paillet, Lebanon, TN (US)

(73) Assignee: SCHNEIDER ELECTRIC USA, INC., Boston, MA (US)

( * ) Notice: Subject to any disclaimer, the term of this patent is extended or adjusted under 35 U.S.C. 154(b) by 487 days.

(21) Appl. No.: 18/280,320

(22) PCT Filed: Mar. 4, 2022

(86) PCT No.: PCT/US2022/018843
§ 371 (c)(1),
(2) Date: Sep. 5, 2023

(87) PCT Pub. No.: WO2022/187579
PCT Pub. Date: Sep. 9, 2022

(65) Prior Publication Data

US 2024/0146694 A1 May 2, 2024

Related U.S. Application Data

(60) Provisional application No. 63/157,304, filed on Mar. 5, 2021.

(51) Int. Cl.
*H04L 9/40* (2022.01)

(52) U.S. Cl.
CPC ................................ *H04L 63/0263* (2013.01)

(58) Field of Classification Search
CPC ............. H04L 63/0263; H04L 63/0218; H04L 63/0236; G06F 9/44505; G06F 9/4411
See application file for complete search history.

(56) References Cited

U.S. PATENT DOCUMENTS 7,903,672 B1 * 3/2011 deRuijter .............. H04L 63/029 370/230.1
2007/0110053 A1 5/2007 Soni et al.
(Continued)

FOREIGN PATENT DOCUMENTS

CN 108718322 A 10/2018
CN 111262861 A 6/2020
WO 2007038872 A1 4/2007

OTHER PUBLICATIONS

Extended European Search Report dated Aug. 23, 2024 for corresponding European Patent Application No. 22764109.9-1218, 14 pages.

(Continued)

*Primary Examiner* — Amie C. Lin
(74) *Attorney, Agent, or Firm* — Quinn IP Law

(57) ABSTRACT

Embodiments provide techniques for securely managing the transmission of register operations to endpoint devices (e.g., circuit breakers and other forms of electrical equipment). A firewall management component can add, through a secure communications channel, an entry to a firewall structure maintained on a firewall device. The entry can specify (i) a register operation for an endpoint device, (ii) a value for the register operation, and (iii) a count of times that the register operation can be performed. The firewall management component transmits register operation to the firewall device to be forwarded to the endpoint device. The firewall device is configured to forward the register operation to the endpoint device only if the count specified in the firewall structure would not be exceeded.

20 Claims, 9 Drawing Sheets

(56) References Cited

U.S. PATENT DOCUMENTS

| | | | | |
|---|---|---|---|---|
| 2009/0025077 | A1* | 1/2009 | Trojanowski ....... | H04L 41/0803<br>726/11 |
| 2013/0139247 | A1* | 5/2013 | Cianfrocca ............ | H04L 63/02<br>726/14 |
| 2014/0105022 | A1 | 4/2014 | Soni et al. | |
| 2014/0334481 | A1* | 11/2014 | Boire-Lavigne ........ | H04L 45/72<br>370/352 |
| 2019/0245856 | A1 | 8/2019 | Irwan et al. | |

OTHER PUBLICATIONS

Chen, Bo et al., "Cyber-physical perspective on smart grid design and operation," IET Cyber-Physical Systems: Theory & Applications, vol. 3, Issue 3, Sep. 1, 2018, pp. 129-141.

International Search Report and Written Opinion mailed Jun. 29, 2022 in corresponding International Application No. PCT/US2022/018843, 14 pages.

* cited by examiner

| Direction | Port | Src/Dest IP | Register / Operation | Value | Count |
|---|---|---|---|---|---|
| Out | 502 | Any/Any | N/A | N/A | |
| In | 502 | A/D | 1101 / Write Only | 0x01 | 1 |

AUTOMATIC FIREWALL CONFIGURATION FOR CONTROL SYSTEMS IN CRITICAL INFRASTRUCTURE

CROSS-REFERENCE TO RELATED APPLICATIONS

This application claims priority to and the benefit of U.S. Provisional Application No. 63/157,304, filed Mar. 5, 2021, the entire contents of which are herein incorporated by reference in their entirety.

TECHNICAL FIELD

The present disclosure relates to computing device security, and more particularly, to techniques for securing control systems for critical infrastructure.

BACKGROUND

Many advancements have been made in recent years in the field of data communications and network security. However, in certain situations, legacy devices that are incapable of adopting these advancements are still in use for a variety of reasons. For example, most circuit breakers in use today do not support message or transport-level security. As a result, these circuit breakers rely on legacy unsecured communication protocols. While replacing these circuit breakers is the best option from a security perspective, many installations make this impractical due to downtime, cost, etc. And more generally, there are industries where unsecured protocols (e.g., clear-text data communications and other unsecured communication protocols) are still in-use and may even be required in order to ensure compatibility and transparency with monitoring and intrusion detection systems.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

Figure 1A:
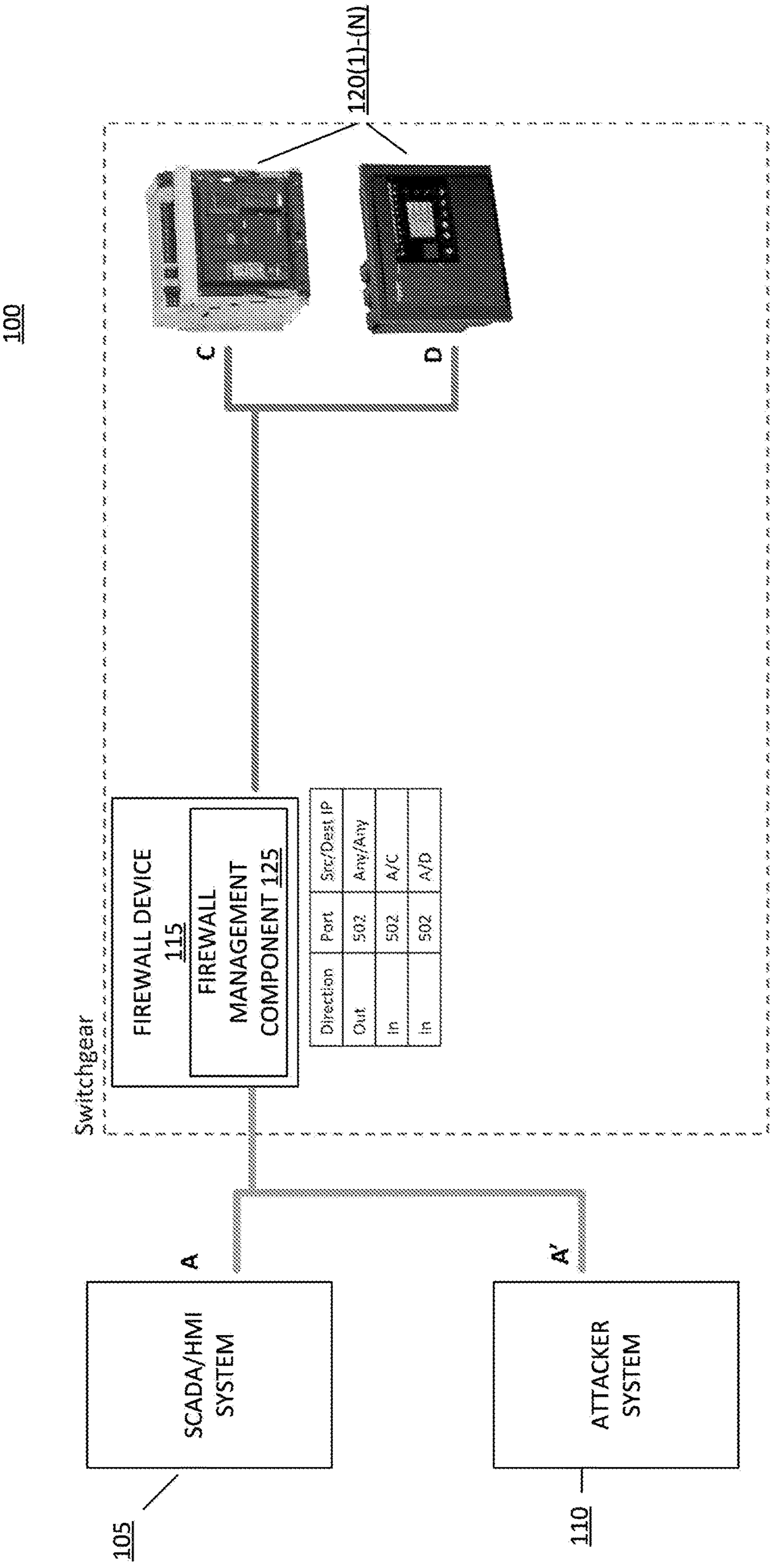
FIGS. 1A-E illustrate various network operations being performed in an industrial network including a firewall, according to one or more embodiments described herein.

Embodiments described herein provide techniques for securing communications in legacy systems. Power systems in critical infrastructure are designed with a solid and secure foundation. This includes implementing a full defense-in-depth strategy with layers of firewalls, intrusion detection systems as well as elements of physical security. One challenge of a securing an implementation is that many devices for power, building management, automation and industrial process require unprotected protocols (such a Modbus or IEC61850) and will not support message-based encryption. While a single vendor can instrument a secure process for their products (such as requiring secure Modbus), there will remain situations where legacy communications must take place with third-party hardware. Embodiments described herein provide a solution to raise the bar on security while allowing the continued use of these legacy protocols.

More particularly, embodiments described herein relate to power monitoring systems and/or Supervisory Control and Data Acquisition (SCADA) system and the ability of these systems to dynamically configure downstream network devices (firewalls, intrusion detection/prevention or SIEM systems) when events or actions occur. Generally, systems exist that communicate with downstream networking devices to configure settings dynamically. However, that these existing systems rely on configured events, statuses or conditions that occur on the network infrastructure. Embodiments described herein not only focus on the network infrastructure, but to also focus on the electrical network infrastructure for events that are happening or are about to happen.

Generally, power systems and/or SCADA systems contain critical information that is not captured and analyzed by these network-based systems today. For instance, a SCADA system may be aware that a load-shedding event is going to take place (e.g., at a specific time or in response to specific user input). Based on this information, the SCADA system could reconfigure, using a secure channel, the security devices on an Industrial Control System (ICS) network to allow specific control messages (resulting in electrical relay or circuit breaker operations). That is, while the legacy devices in these networks may not be able to implement appropriate security protocols, modern security devices (e.g., routing devices) may be configured to implement modern security measures. Accordingly, embodiments can transmit configuration instructions to the security devices using a secure channel (e.g., encrypting the configuration instructions using a public key previously provided by the security device, whereby the security device could use a private key to decrypt the received configuration instructions). Once the operation is complete, the network could then be re-configured to a more secure state. Advantageously, embodiments described herein provide the programmatic creation of signatures for packet data to instruct the firewall on when to permit or block the passage of data, thereby improving the security of the system.

One part of the defense-in-depth strategy to securing a network involves placing firewalls at various levels of the network hierarchy. This includes edge firewalls (at the edge, or “entrance” to the network) as well as lower level subnetworks (e.g., within a single switch board or panel board).

Conventionally, power systems may only include an edge firewall and the remainder of the ICS network (or power network) is considered "secure," but this misconception leads to a false sense of security. Further, even for systems with multiple firewalls on varying layers, these systems are generally setup in an IT-centric fashion, where security is concentrated on TCP ports and IP addresses, and not the actual protocol data that they permit to pass.

Recent firewalls have the ability to pass traffic based on the application, or protocol. Some firewalls have the ability to inspect ICS-specific protocols such as Modbus or IEC61850. In these cases, the firewall can condition the traffic to only allow control writes to, e.g., a specific Modbus register. Unfortunately, most conventional ICS firewalls have shortcomings that make it impossible to use for the intended purpose. For instance, many Modbus devices have custom functions (or vendor functions) that the ICS firewall does not understand. As a result, most conventional ICS firewalls are configured in a way that they are essentially TCP-port filtering (e.g., for Modbus, they are open on port 502 for all traffic).

Embodiments described herein provide a firewall configured to understand ICS protocols and to include a time-based element and a trigger that is defined in the SCADA or software system. ICS Firewalls typically have a secured API interface that could allow communication directly from a SCADA, and ICS-capable firewalls generally have the ability to customize a signature for traffic that they are instructed to permit or block. For instance, if given an example TCP packet of desired data (e.g., from Wireshark or some other packet capturing software), one can configure the firewall with portions of the packet data, in conjunction with regular expression and basic conditional operators, to permit or block similar packets in the future. Embodiments described herein take advantage of this by programmatically orchestrating signatures in real time and applying them at precise times.

Generally, a SCADA system has a system-level context, meaning that the SCADA system is aware of all of the devices on the network, all of the device capabilities (e.g., including register maps/lists) and all of the other computers and network-capable devices on the ICS network. The SCADA typically contains this context as it is the responsibility of the SCADA to communicate with the human users (through a Human Machine Interface (HMI) or other means such as notification). In addition to the static context, the SCADA system may also be aware of upcoming events and actions that may take place.

Using a scheduler, the SCADA system may start a sequence of control operations at a specific time. For example, the SCADA system may have an event-triggered script that executes control commands when a specific event is triggered. Using this additional context, the SCADA system can "wrap" control signals with firewall updates.

The SCADA system can also send updates to the firewall when the state of the system changes. For instance, if a device is added to the SCADA system, then the SCADA system can send the necessary configuration updates to the firewalls to allow data to travel from this new device. As the SCADA system already has the information about the device (IP address, Modbus register map, etc.), the SCADA system can develop signatures to be used for configuration (in XML or similar format).

According to one embodiment described herein, a SCADA system can manage the addition and/or removal of a device from a power network. For example, a power metering device could be installed in a panel that requires communication with the SCADA system. In the present example, the device has an IP address configured locally, and an application engineer adds the device by providing the IP address to the SCADA system using the SCADA development environment.

Based on the IP address provided, the SCADA system could identify that a firewall is installed in the panel. The SCADA system could recognize that this is a new device and, in response, generate signatures for the device to allow communication. The SCADA system could then securely configure the firewall (using a previously configured Firewall connection with certificates exchanged) and attempt to communicate with the new power device. In one embodiment, the SCADA system is configured to not attempt communication with the power device until the firewall is successfully configured (as it realizes that communication is not possible).

According to one embodiment described herein, the SCADA system can provide security for a circuit breaker(s) that use legacy communication protocols. Generally, most circuit breakers in use today do not support message or transport-level security. As a result, these circuit breakers rely on legacy unsecured communication protocols. While replacing these circuit breakers is the best option from a security perspective, many installations make this impractical due to downtime, cost, etc. Embodiments described herein can secure control operations in these legacy systems using strategic signatures on the firewalls and enabling rules at critical times.

In one example, a circuit breaker is installed in a panel that includes an ICS firewall. The circuit breaker communicates via Modbus and may be configured to support critical commands, namely open, close and reset. The commands can be triggered by the SCADA system. In the present example, the device could be installed using the same mechanism as in the previous use case (so the SCADA can generate signatures for this circuit breaker, including open, close and reset). These signatures can be configured as rules on the firewall and could initially be set to deny (meaning that the traffic is not allowed).

The SCADA system could issue a command to open the circuit breaker. For example, the SCADA system could receive a request from a user (e.g., via a Human Machine Interface (HMI)) or a process to open a circuit breaker. The SCADA system could recognize that the circuit breaker is behind the firewall, and in response could first send a firewall configuration message through a secure communications channel to tell the firewall to allow the rule for "open". In one embodiment, the SCADA system could further specify a number of other attributes for the rule, e.g., the open command is allowed if it comes from a specific IP address, a specific port, a specific Modbus station identifier, and/or if the open command is directed to a specific IP address, a specific destination port and/or a specific destination Modified station identifier. Of course, such an example is provided for illustrative purposes only, and more generally the security techniques described herein are applicable to and can be applied to other protocols, consistent with the functionality described herein.

The SCADA system could then send the open command, which successfully traverses the firewall and is executed on the breaker. The SCADA system could then send a firewall configuration message to deny the rule for "open", effectively locking the circuit breaker back down. In a particular embodiment, the SCADA system could include a "count" value when providing the original rule that the firewall device is configured to decrement each time the rule is satisfied and the corresponding operation executed. Moreover, the firewall device could be configured to only consider rules having a count value above 0, and may delete (e.g., in real-time, as a periodic batch operation, etc.) rules having a count value of 0. As an example, the SCADA system could specify a count of "1" for the original rule, thereby avoiding a need to transmit a subsequent configuration message to deny the rule for "open", as the rule can only be executed a single time due to the specified count value.

In one embodiment, the "open" rule is intentionally different from the "close" rule. This is because if the rule were "operate", then an attacker could flood the network with "close" commands when we are attempting to send an "open" command. In the scenario presented, only the command issued by the SCADA would be passed (even if a malicious flood were occurring).

Most of the time in security-sensitive environments a fail-secure methodology is required. In the case of a circuit breaker, such devices are generally required to fail-safe, meaning that the firewall should be configured to allow "open" in the event of communication loss, etc. For this reason, the SCADA system could poll the firewall to ensure that it is in operation and alert users if failures are detected. In one embodiment, a "rule" as referred to herein may contain not only the signature data discussed, but it also includes the traditional firewall rule data (e.g., IP address of sender and recipient, TCP/UDP port addresses, etc.).

FIGS. 1A-E illustrate various network operations being performed in an industrial network including a firewall, according to one or more embodiments described herein. As shown in FIG. 1A, the system 100 includes a SCADA/HMI system 105, a malicious attacker system 110, a firewall device 115 and a plurality of endpoint devices 120(1)-(N). In the system 100, the IT firewall 115 is configured with conventional forwarding rules, where outgoing messages can be sent on port 502 to and from any devices, while incoming messages on port 502 can only be sent from device A (the SCADA/HMI system 105) to device C (endpoint device 120(1)) and from device A to device D (endpoint device 120(N)). While such a firewall configuration can protect against many attacks, such a configuration may be vulnerable to the attacker system 110 spoofing the identity of the SCADA/HMI system 105.

Figure 1B:
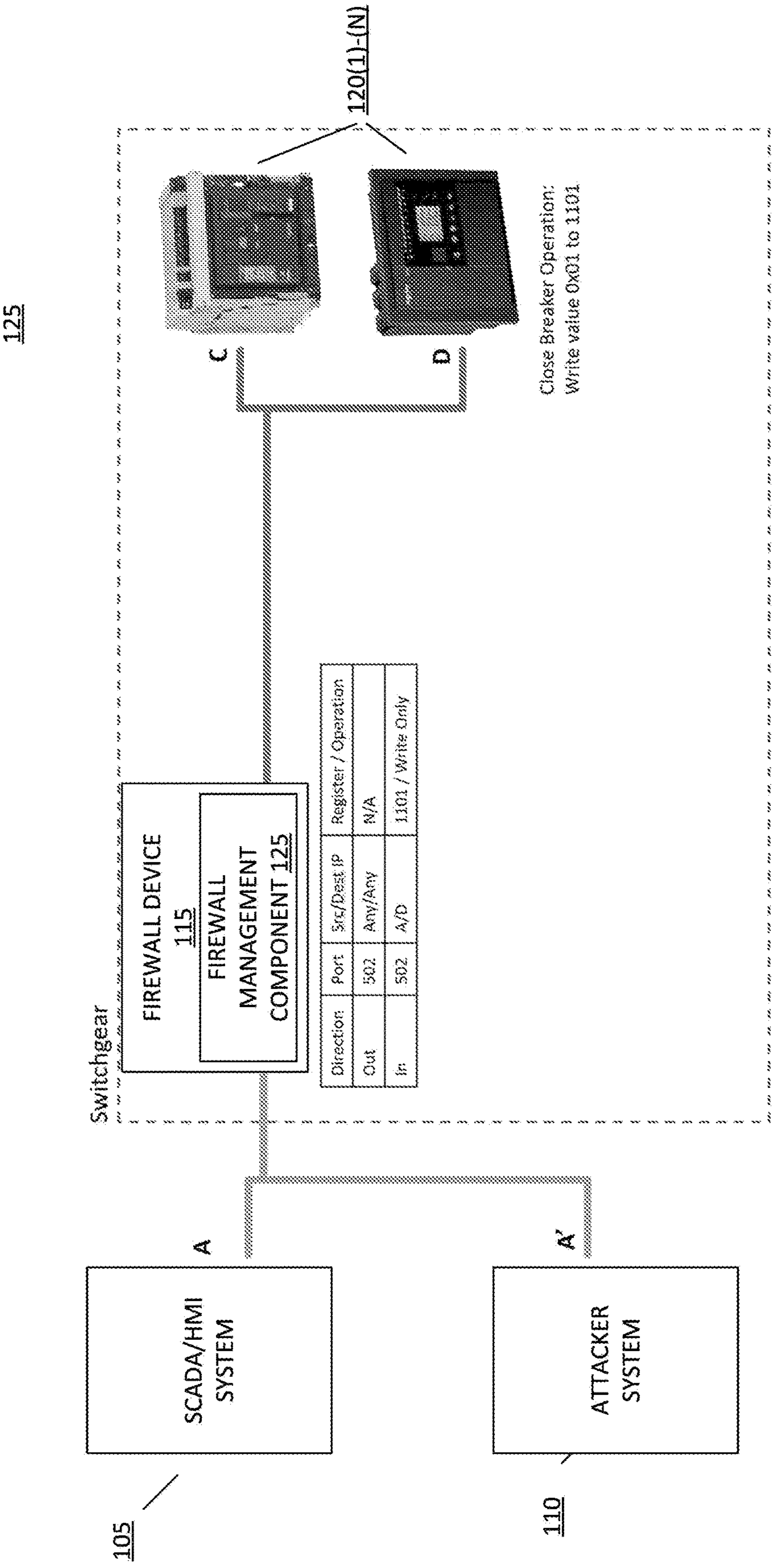
Figure 1C:
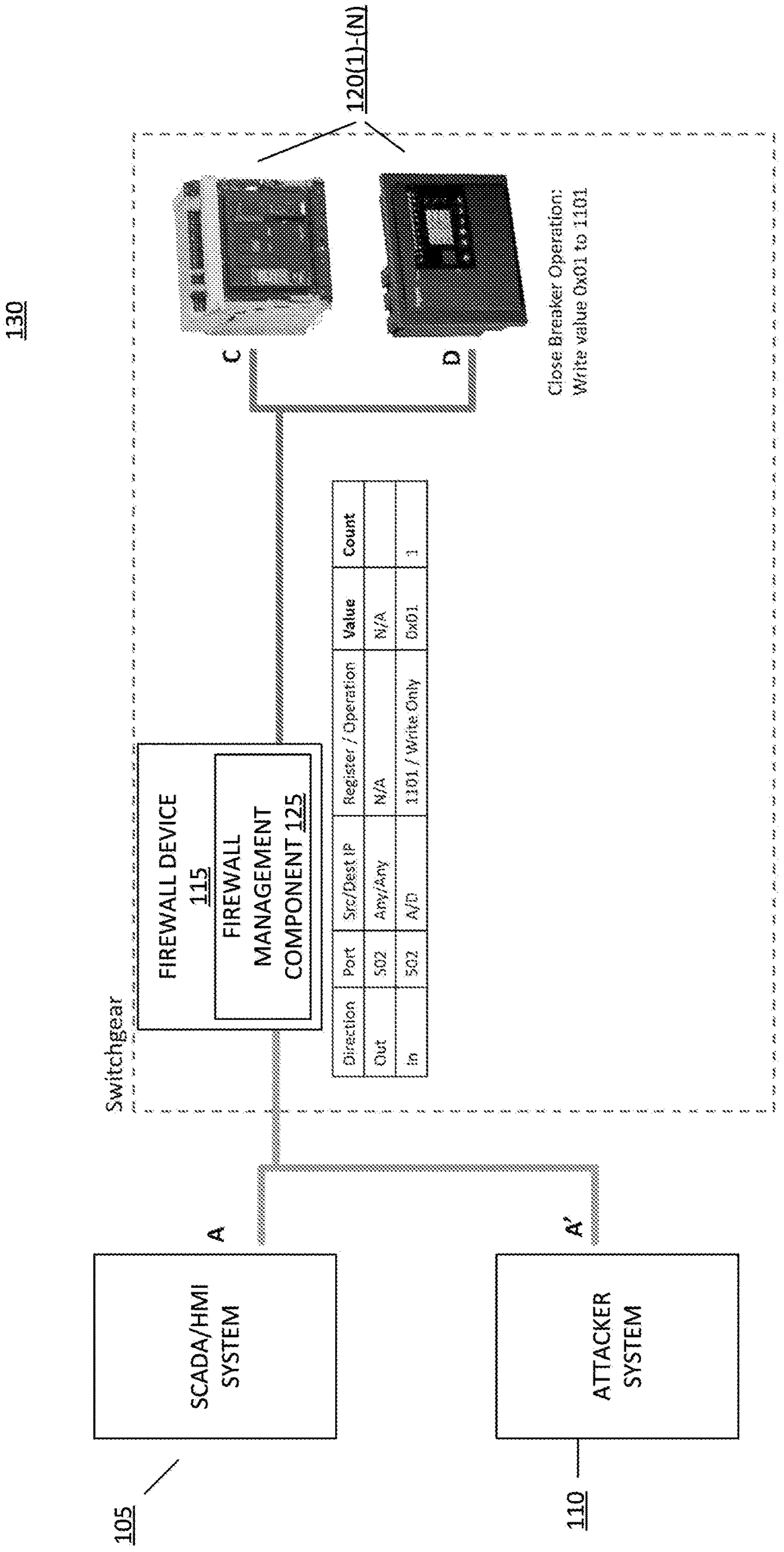

FIG. 1B illustrates a system 125, where the configuration table of the firewall device 115 includes a rule that states that device A (the SCADA/HMI system 105) is allowed to send only write operations to register 1101 of endpoint device D (the endpoint device 120(N)). While such a configuration can protect against additional attacks relative to the system 100 shown in FIG. 1A, the firewall device 115 having the configuration shown in FIG. 1B is still vulnerable to certain spoofing attacks (e.g., where the malicious attacker is able to spoof the identity of the SCADA/HMI system 105).

FIG. 10 illustrates a more secure system 130, where the firewall device 115 is configured with a register operation according to one embodiment described herein. As discussed above, while the SCADA/HMI system 105 may be configured to send commands to the firewall device 115 over a secure channel, in some legacy environments the endpoint devices 120(1)-(N) may not be configured to communicate over such secure channels. Moreover, many legacy environments today still utilize traffic monitoring tools to monitor traffic going to and from the endpoint devices 120(1)-(N), and these tools may require unencrypted network communications in order to properly monitor the traffic.

As such, according to one embodiment described herein, the SCADA/HMI system 105 can add, through a secure communications channel, an entry to a firewall structure maintained on a firewall device 115. For example, the SCADA/HMI system 105 can transmit the entry to the firewall management component 125 on the firewall device 115 over a secure communications channel (e.g., by encrypting the message in such a way that the firewall management component 125 can, upon receiving the encrypted message, can decrypt it to access the message's contents). The entry can specify (i) a register operation for an endpoint device, (ii) a value for the register operation, and (iii) a count of times that the register operation can be performed. In the depicted example, the firewall device 115 in the system 130 is configured with a rule stating that source device A (the SCADA/HMI system 105) is allowed to perform write operations to register 1101 of endpoint device D (endpoint device 120(N)), and more specifically the source device A is only permitted to write the value 0x01 to the register a single time (as indicated by the count value of 1).

The SCADA/HMI system 105 can then transmit the register operation to the firewall device over an unsecured communications channel and in an unencrypted format to be forwarded to the endpoint device. The firewall management component 125 can be configured to forward the register operation to the endpoint device only if the count specified in the firewall structure would not be exceeded, and to decrement the count and/or remove the configuration table entry upon successfully forwarding the register operation to the endpoint device. As such, embodiments may securely send the register operation to the appropriate endpoint device using unsecured communications, and yet the system 130 is protected against attack from the attacker system 110. That is, even if the attacker system 110 were to successfully spoof the identity of the SCADA/HMI system 105, the attacker system 110 would only be able to submit the desired register operation having a value of 0x01 to the desired register 1101 a single time. In other words, the only "attack" that would be permitted in the depicted system 130 would be the desired result, i.e., the completion of the requested operation a single time.

Figure 1D:
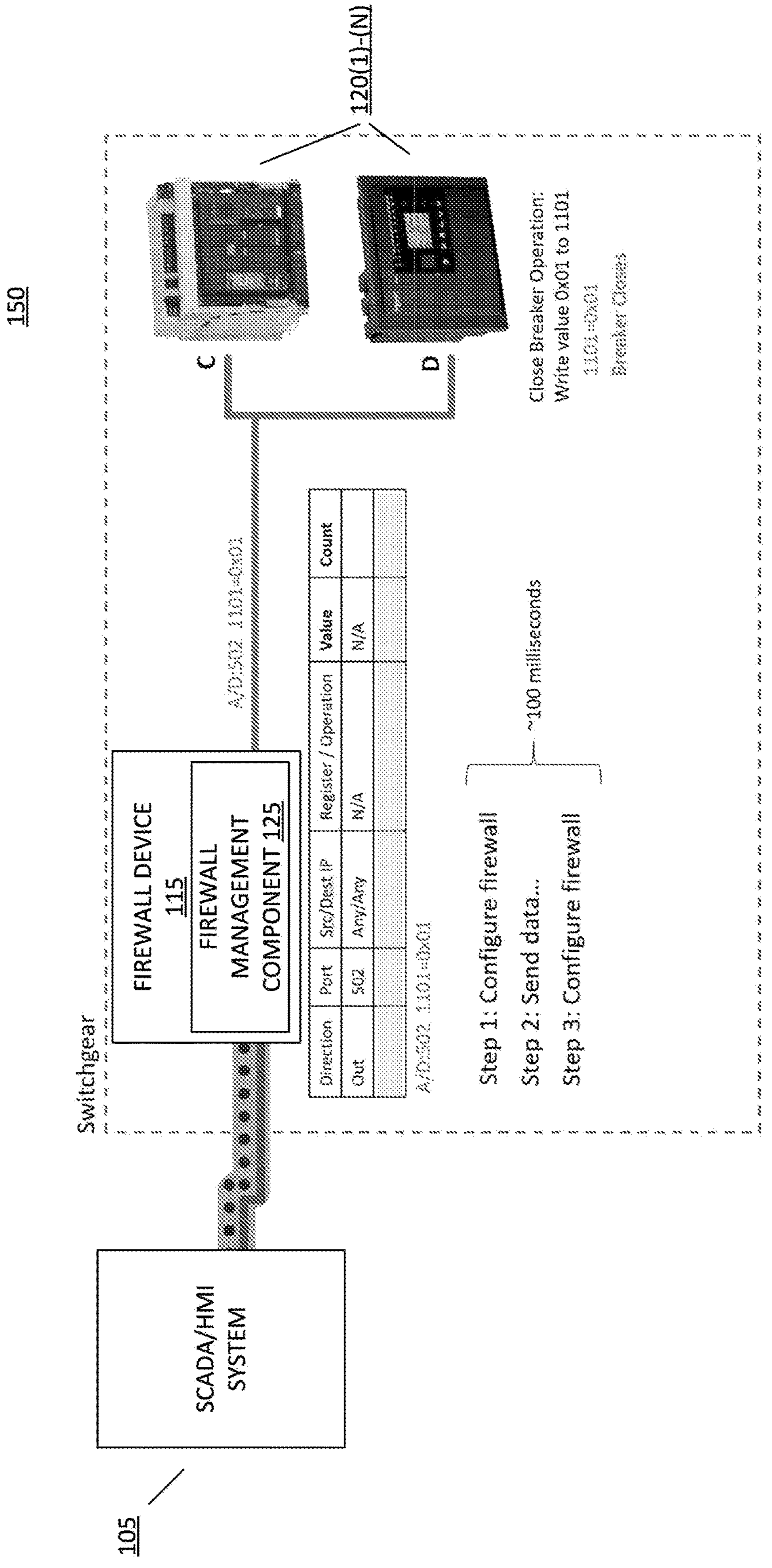

FIG. 1D illustrates a system 150, where the SCADA/HMI system 105 is configured to send a configuration operation to the firewall device 115 before sending register operation to an endpoint device, each time the SCADA/HMI system 105 wishes to send a register operation to an endpoint device. As discussed above, the SCADA/HMI system 105 may send the configuration operation to the firewall device 115 over a secure channel, before sending the register operation to the endpoint device over an unsecured channel. While such an embodiment may add a slight delay (e.g., ~100 milliseconds) to the transmission of a register operation, such an embodiment enables legacy devices to receive unsecured communications while still ensuring the overall security of the network.

Figure 1E:
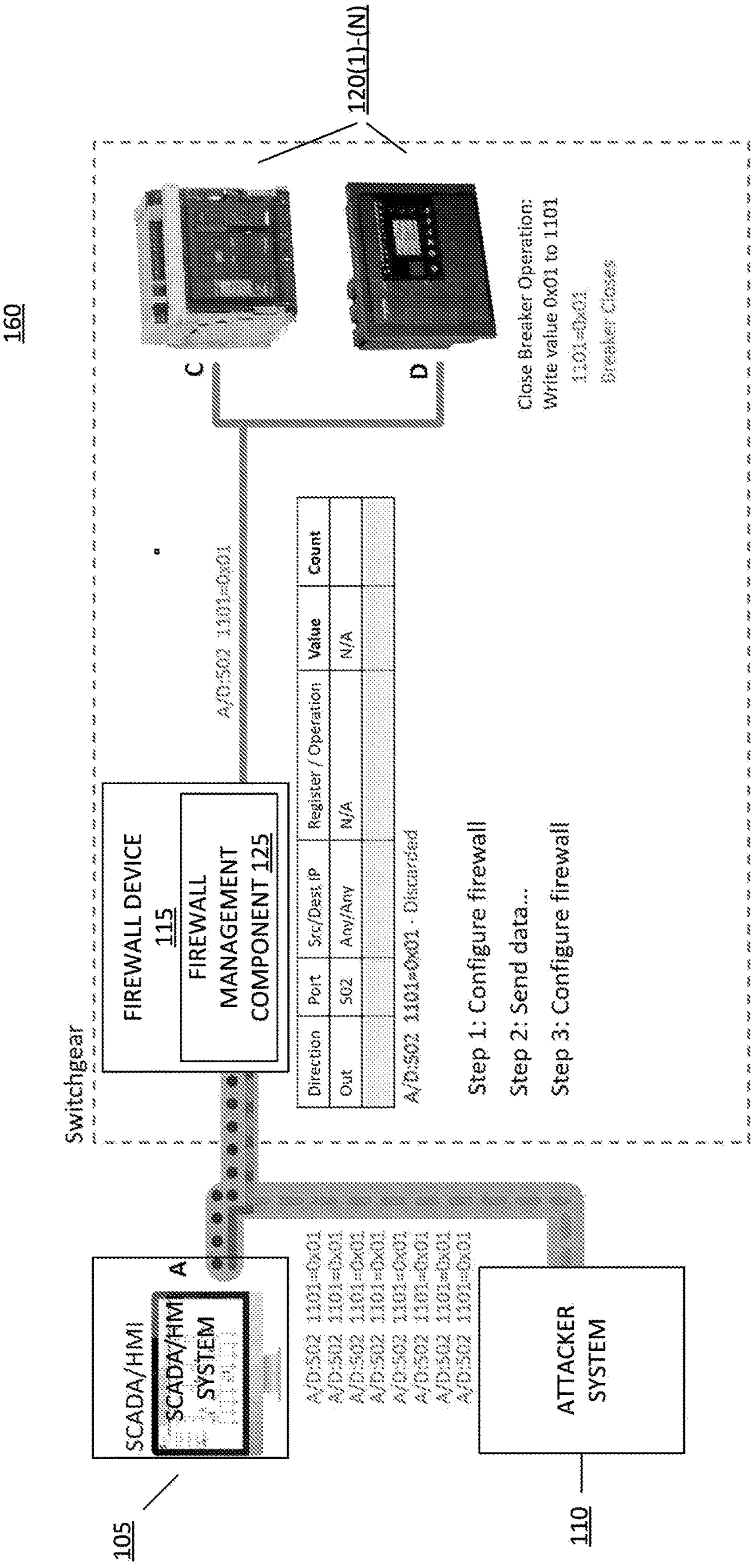

FIG. 1E illustrates a system 160, where the attacker system 110 attempts to send numerous malicious register operations to the endpoint device D. In the depicted example, once the first register operation is transmitted to the endpoint device D from the SCADA/HMI system 105 (as shown in FIG. 10), the firewall device 115 removes the corresponding entry from the configuration table. That is, as discussed above, the entry shown in the firewall configuration table of FIG. 10 had a count of 1, and thus after a single register operation having a value of 0x01 was transmitted to the register 1101 of endpoint device D, the entry was removed from the firewall configuration table. As the configuration table shown in FIG. 1E does not contain such an entry (as it has been removed), the malicious register operations from the attacker system 110 are merely discarded by the firewall device 115.

Figure 2:
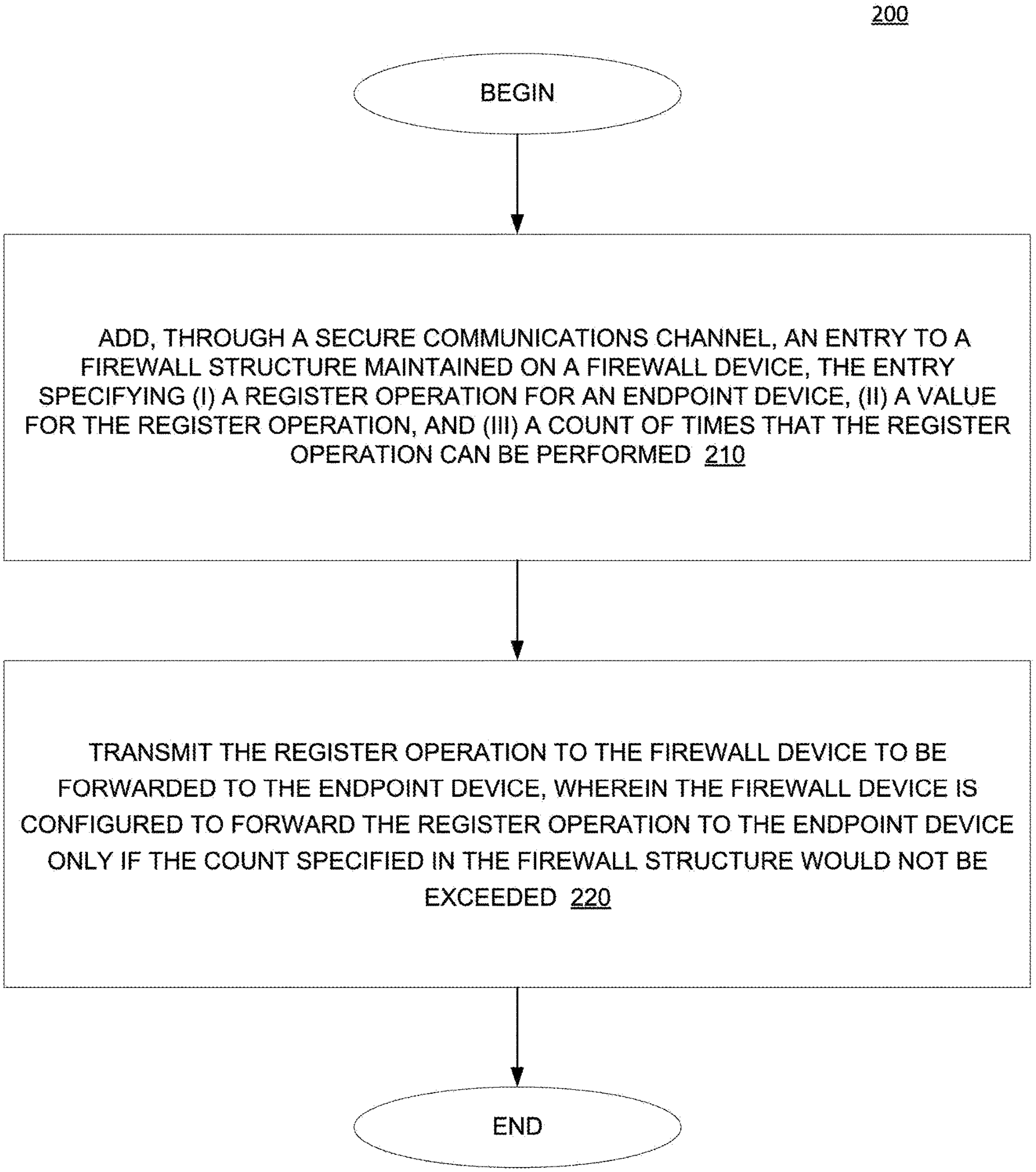
FIG. 2 is a block diagram illustrating a method for securely transmitting a register operation to an endpoint device, according to one embodiment described herein.

FIG. 2 is a block diagram illustrating a method for securely transmitting a register operation to an endpoint device, according to one embodiment described herein. As shown, the method 200 begins at block 210, where a SCADA/HMI system 105 adds, through a secure communications channel, an entry to a firewall structure maintained on a firewall device. According to one embodiment, the entry specifies (i) a register operation for an endpoint device, (ii) a value for the register operation, and (iii) a count of times that the register operation can be performed. The SCADA/HMI system 105 then transmits the register operation to the firewall device to be forwarded to the endpoint device. As discussed above, the SCADA/HMI system 105 may send the register operation via an unencrypted channel (as may be required to communicate with legacy devices). The firewall device is generally configured to forward the register operation to the endpoint device only if the count specified in the firewall structure would not be exceeded. Doing so helps to ensure the security of the network, despite the limitations of legacy devices in being unable to send or receive secured communications.

Figure 3:
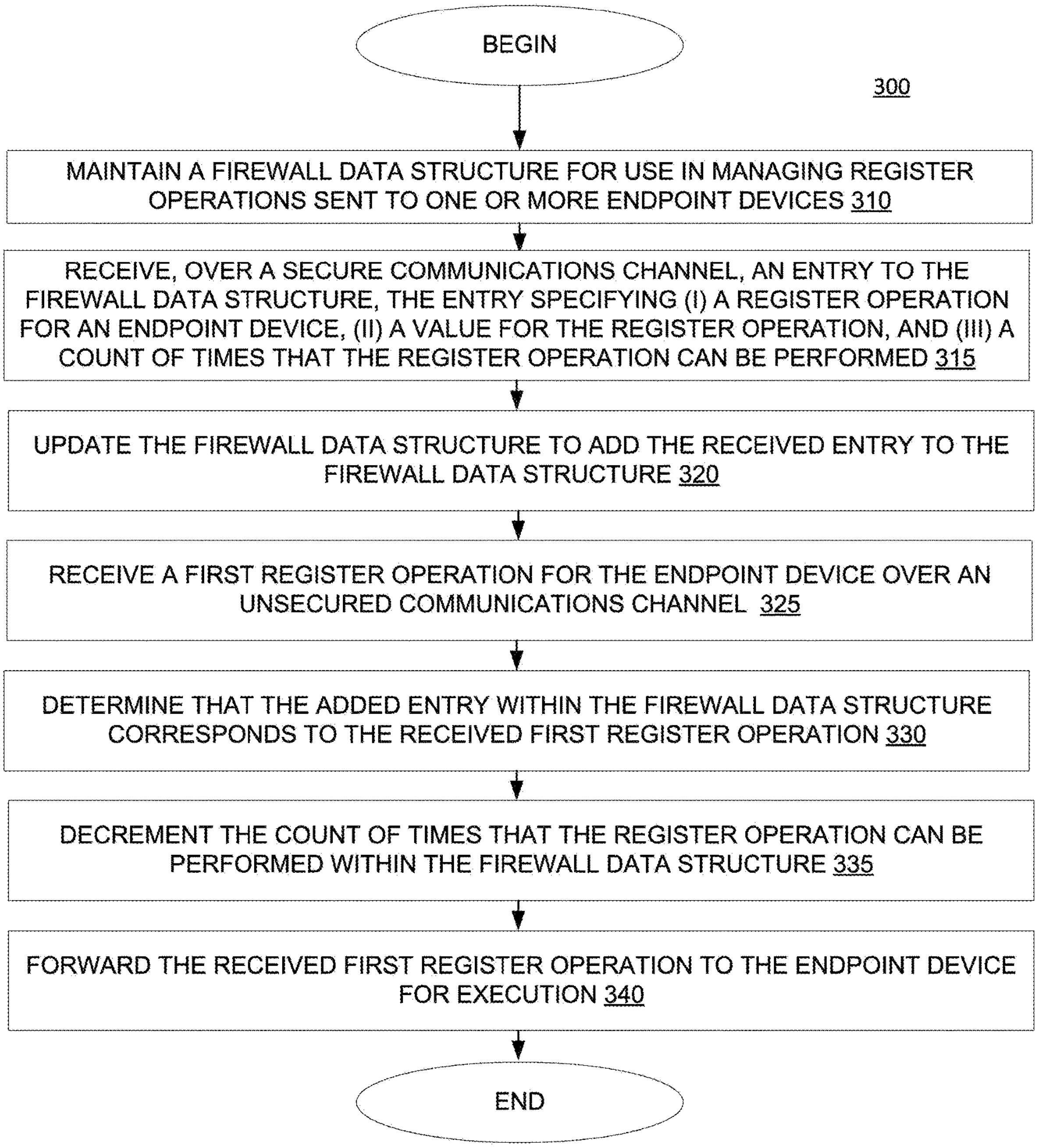
FIG. 3 is a flow diagram illustrating a method for using a firewall data structure to manage register operations for endpoint devices, according to one embodiment described herein.

FIG. 3 is a flow diagram illustrating a method for using a firewall data structure to manage register operations for endpoint devices, according to one embodiment described herein. As shown, the method 300 begins at block 310, where the firewall management component 125 maintains a firewall data structure for use in managing register operations sent to one or more endpoint devices. Such a structure can be maintained in system memory, on hard disk storage and/or a combination of the two.

The firewall management component 125 receives, over a secure communications channel, an entry to the firewall data structure, the entry specifying (i) a register operation for an endpoint device, (ii) a value for the register operation, and (iii) a count of times that the register operation can be performed (block 315). For example, the firewall management component 125 can be preconfigured with a private key and the entry could be encrypted by system transmitting the entry (e.g., a SCADA/HMI system) using a corresponding public key. The firewall management component 125 could then decrypt the received entry using the private key in order to access the entry's contents.

The firewall management component 125 updates the firewall data structure to add the received entry to the firewall data structure (block 320). The firewall management component 125 subsequently receives a first register operation for the endpoint device over an unsecured communications channel (block 325). The firewall management component 125 determines that the added entry within the firewall data structure corresponds to the received first register operation (block 330). For example, the firewall management component 125 could query the firewall data structure to determine if the firewall data structure contains an entry corresponding to a particular register operation having a particular value and for a particular endpoint device.

In one embodiment, if the firewall management component 125 determines that the firewall data structure does not contain an entry corresponding to the first register operation (e.g., based on the endpoint device identifier, register operation and value specified in the first register operation), the firewall management component 125 could discard the first register operation without forwarding the first register operation to the endpoint device. Similarly, if the firewall management component 125 accesses the firewall data structure and determines that the entry corresponding to the first register operation has a count less than or equal to 0, the firewall management component 125 could discard the first register operation without forwarding the first register operation to the endpoint device. Doing so enables the firewall device to ensure that register operations are only transmitted a specified number of times to preconfigured endpoint devices and with preconfigured values, thereby preventing flooding and other forms of attack against the endpoint devices.

In the depicted embodiment, the firewall management component 125 decrements the count of times that the register operation can be performed within the firewall data structure (block 335) and forwards the received first register operation to the endpoint device for execution (block 340), and the method 300 ends.

Figure 4:
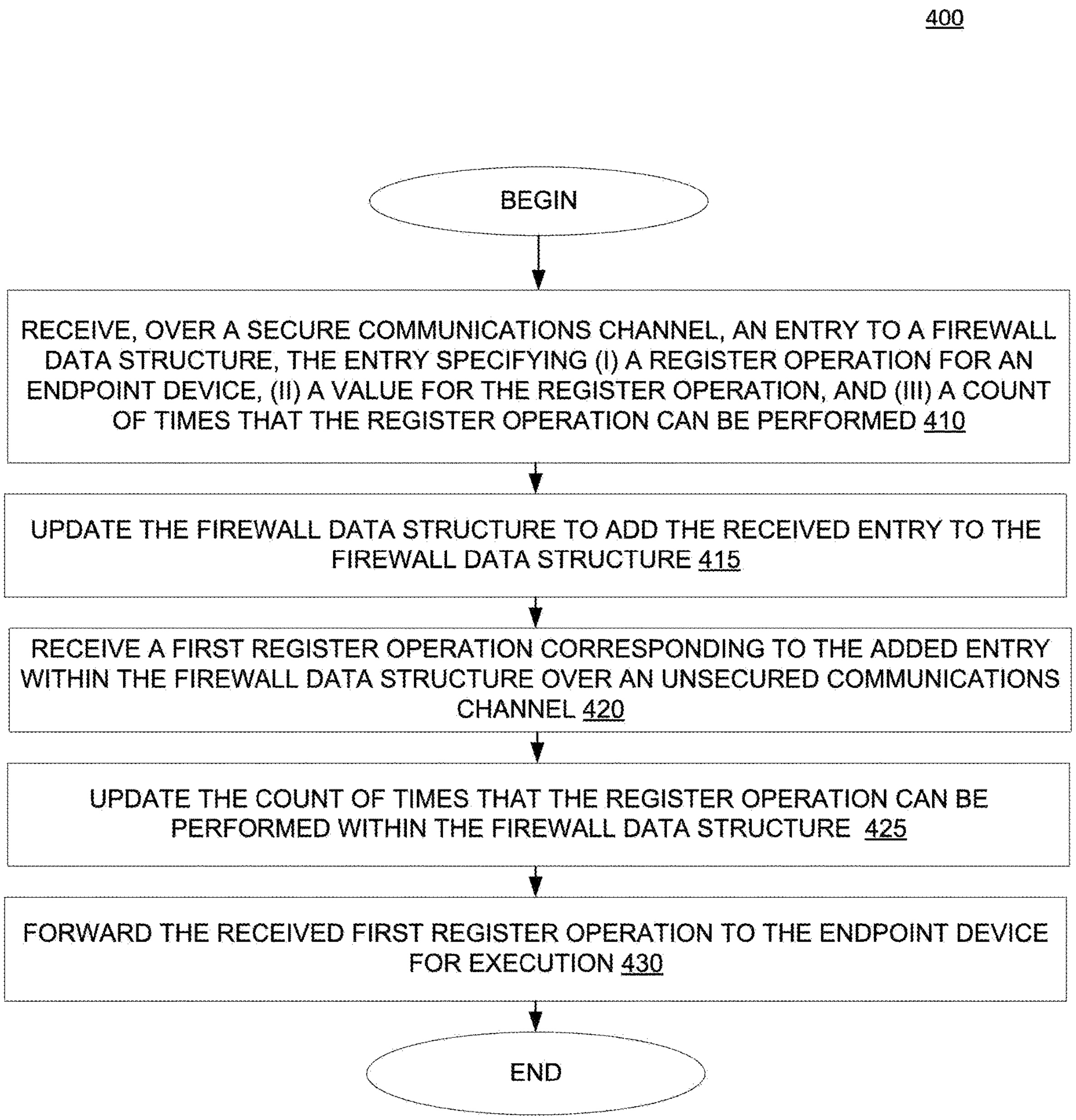
FIG. 4 is a flow diagram illustrating a method for using a firewall data structure to manage register operations for endpoint devices, according to one embodiment described herein.

FIG. 4 is a flow diagram illustrating a method for using a firewall data structure to manage register operations for endpoint devices, according to one embodiment described herein. As shown, the method 400 begins at block 410, where the firewall management component 125 receives, over a secure communications channel, an entry to a firewall data structure, the entry specifying (i) a register operation for an endpoint device, (ii) a value for the register operation, and (iii) a count of times that the register operation can be performed. The firewall management component 125 updates the firewall data structure to add the received entry to the firewall data structure (block 415). The firewall management component 125 subsequently receives a first register operation corresponding to the added entry within the firewall data structure over an unsecured communications channel (block 420). Upon receiving the first register operation, the firewall management component 125 updates the count of times that the register operation can be performed within the firewall data structure (block 425). The firewall management component 125 forwards the received first register operation to the endpoint device for execution (block 430), and the method 400 ends.

Figure 5:
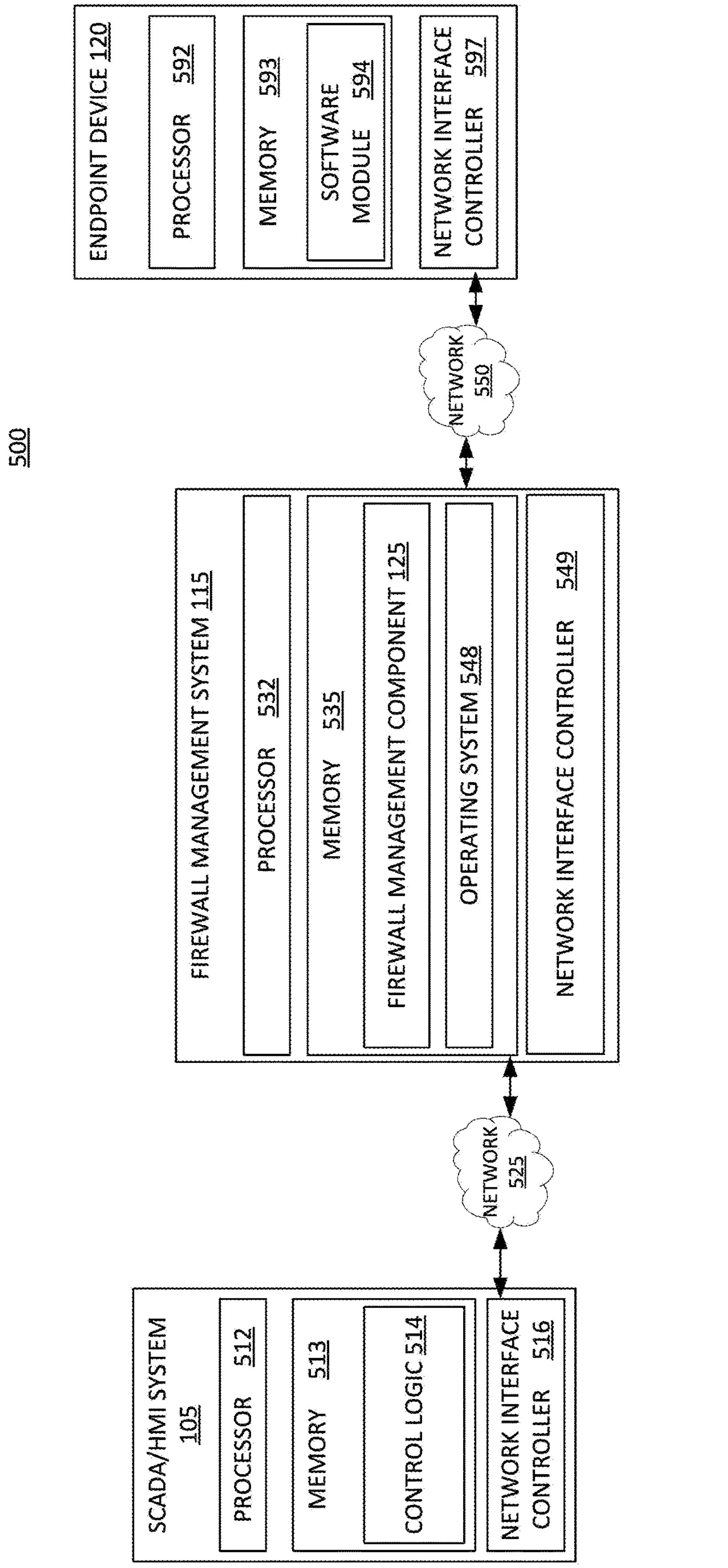
FIG. 5 is a block diagram illustrating a system configured with a firewall management component, according to one embodiment described herein.

FIG. 5 is a block diagram illustrating a system configured with a firewall management component, according to one embodiment described herein. The system 500 includes a SCADA/HMI system 105, a firewall management system 115 and an endpoint device 120. The SCADA/HMI system 105 depicted in FIG. 5 includes one or more computer processors 512, a non-transitory computer-readable memory 513, and a network interface controller 516. The memory 513 contains a control logic component 514. For example, the control logic component 514 could be configured to securely transmit firewall entries to the firewall management component 125 on the firewall management system 115.

The firewall management system 105 includes one or more computer processors 532, a non-transitory computer-readable memory 535, and a network interface controller 549. The memory 535 contains a firewall management component 125 and an operating system 548. Generally, the firewall management component 125 represents software logic that can generate and manage a firewall data structure for use in managing register operations that can be transmitted to the endpoint device 120. As described herein, a software module refers to any software component, including (without limitation) device firmware, a software application, a module for a software application, a suite of software applications, and so on. Generally, the operating system 548 represents any suitable operating system for a computing device.

The endpoint device 120 includes one or more computer processors 592, a non-transitory computer-readable memory 593, and a network interface controller 597. The memory 593 contains a software module 594. Generally, the software module 594 contains device-specific control logic for managing the operation of the endpoint device 120. For example, in an embodiment where the endpoint device 120 represents a circuit breaker, the software module 594 could be configured to process register operations for opening and closing the circuit breaker, retrieving status information corresponding to the circuit breaker and/or one or more sensors connected to the circuit breaker, etc. As described herein, a software module refers to any software component, including (without limitation) device firmware, a software application, a module for a software application, a suite of software applications, and so on.

Many products today in critical infrastructure do not support secure protocols and yet for reasons discussed above, these products will continue to operate for years to come. Embodiments described herein present a solution to securely integrating with these products and provide an effective layered firewall approach.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

A more detailed description of the disclosure may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled

We claim:

1. A firewall device, comprising:

one or more computer processors; and a non-transitory memory containing computer program code that, when executed by operation of the one or more computer processors, cause the one or more computer processors to perform operations comprising:

maintaining, via the non-transitory memory, a firewall data structure used in managing register operations sent to an electrical control endpoint device in a power monitoring or industrial control system;

receiving, over a secure communications channel, an entry to the firewall data structure, the entry specifying (i) a register operation for changing an operating state of the electrical control endpoint device, (ii) a preconfigured value identifying the register operation, and (iii) a count of times that the register operation can be performed;

updating, in the non-transitory memory, the firewall data structure to add the received entry to the firewall data structure as an added entry;

receiving a first register operation for the electrical control endpoint device over an unsecured communications channel;

determining that the added entry within the firewall data structure corresponds to the received first register operation;

decrementing the count of times that the register operation can be performed within the firewall data structure; and forwarding the received first register operation to the electrical control endpoint device for execution.

2. The firewall device of claim 1, wherein the first register operation is transmitted across the unsecured communications channel in a cleartext data format.

3. The firewall device of claim 2, wherein the unsecured communications channel is used to transmit data conforming to a Modbus data communications protocol.

4. The firewall device of claim 1, the operations further comprising:

determining the count of times that the register operation can be performed is equal to zero; and removing, responsive to determining the count of times is equal to zero, an entry corresponding to a second register operation from the firewall data structure.

5. The firewall device of claim 1, wherein the electrical control endpoint device is a circuit breaker or an electrical relay configured to change to an open state upon receiving the first register operation.

6. The firewall device of claim 1, wherein the first register operation is forwarded to the electrical control endpoint device using a second unsecured communications channel, distinct from the unsecured communications channel, wherein the firewall device, the electrical control endpoint device, and the second unsecured communications channel are located within a secured physical environment.

7. The firewall device of claim 6, wherein the second unsecured communications channel is used to transmit data conforming to a Modbus data communications protocol.

8. A method of controlling a firewall device, the method comprising:

maintaining, via a memory device, a firewall data structure used in managing register operations sent to an electrical control endpoint device of a power monitoring or industrial control system;

receiving, over a secure communications channel, an entry to the firewall data structure, the entry specifying (i) a register operation for changing an operating state of the electrical control endpoint device, (ii) a preconfigured value identifying the register operation, and (iii) a count of times that the register operation can be performed;

adding the received entry to the firewall data structure as an added entry:

receiving a first register operation for the electrical control endpoint device;

determining that the first register operation received for the electrical control endpoint device corresponds to the added entry within the firewall data structure;

decrementing the count of times that the register operation can be performed within the firewall data structure; and transmitting the first register operation, via the firewall device, to the electrical control endpoint device, wherein the firewall device transmits the register operation to the electrical control endpoint device responsive to the count of times within the firewall structure not being zero.

9. The method of claim 8, wherein the register operation is transmitted over an unsecured communications channel.

10. The method of claim 9, wherein the unsecured communications channel is used to transmit data conforming to a Modbus data communications protocol, and wherein data is transmitted across the unsecured communications channel in cleartext.

11. The method of claim 8, further comprising:

determining, via the firewall device, the count of times that the register operation can be performed is equal to zero; and removing, responsive to determining the count of times is equal to zero, an entry corresponding to a second register operation from the firewall data structure.

12. The method of claim 8, further comprising executing, via the electrical control endpoint device, the first register operation to change the operating state of the electrical control endpoint device upon receiving the first register operation from the firewall device.

13. The method of claim 8, wherein the first register operation is forwarded to the electrical control endpoint device by the firewall device using a second unsecured communications channel, distinct from the unsecured communications channel, and wherein the firewall device, the electrical control endpoint device, and the second unsecured communications channel are located within a secured physical environment.

14. The method of claim 13, wherein the second unsecured communications channel is used to transmit data conforming to a Modbus data communications protocol.

15. A non-transitory computer-readable medium containing computer program code that, when executed by operation of one or more computer processors, performs operations comprising:

receiving, over a secure communications channel, an entry to a firewall data structure on a firewall device, the entry specifying (i) a register operation for changing an operating state of an electrical control endpoint device in a power monitoring or industrial control system, (ii) a preconfigured value identifying the register operation, and (iii) a count of times that the register operation can be performed;

updating the firewall data structure to add the received entry to the firewall data structure as an added entry; and upon receiving a first register operation corresponding to the added entry within the firewall data structure over an unsecured communications channel:

decrementing the count of times that the register operation can be performed within the firewall data structure; and forwarding the received first register operation to the electrical control endpoint device for execution.

16. The non-transitory computer-readable medium of claim 15, wherein the unsecured communications channel is used to transmit data conforming to a Modbus data communications protocol, and wherein data is transmitted across the unsecured communications channel in cleartext.

17. The non-transitory computer-readable medium of claim 15, the operations further comprising:

determining the count of times that the register operation can be performed is equal to zero; and removing, responsive to determining the count of times is equal to zero, an entry corresponding to a second register operation from the firewall data structure.

18. The non-transitory computer-readable medium of claim 15, wherein the endpoint device is configured to execute the first register operation upon receiving the first register operation.

19. The non-transitory computer-readable medium of claim 15, wherein the first register operation is forwarded to the endpoint device for execution using a second unsecured communications channel, and wherein the firewall device, the endpoint device and the second unsecured communications channel are located within a secured physical environment.

20. The non-transitory computer-readable medium of claim 19, wherein the second unsecured communications channel is used to transmit data conforming to a Modbus data communications protocol.

* * * * *